United States Patent [19]

Sachs

[11] 4,027,835

[45] June 7, 1977

[54] AIRPLANE

[76] Inventor: Elmer B. Sachs, 3371 Rexford St., Ventura, Calif. 93003

[22] Filed: Aug. 28, 1975

[21] Appl. No.: 608,578

[52] U.S. Cl. .............................. 244/101; 114/274; 244/2; 244/108; 244/137 R

[51] Int. Cl.² ...................................... B64C 25/52

[58] Field of Search ............. 244/101, 108, 105, 2, 244/118 R, 137 R, 137 P; 114/66.5 R, 66.5 H, 66.5 F

[56] References Cited

UNITED STATES PATENTS

| 2,021,876 | 11/1935 | DeSeversky | 244/108 |
| 2,472,947 | 6/1949 | Hlobil | 244/118 R |
| 2,692,096 | 10/1954 | Pierce | 244/108 X |
| 3,111,924 | 11/1963 | Ecroyd et al. | 114/66.5 R |
| 3,162,167 | 12/1964 | Wynne | 114/66.5 R |

*Primary Examiner*—Trygve M. Blix
*Assistant Examiner*—Barry L. Kelmachter
*Attorney, Agent, or Firm*—Jack C. Munro

[57] ABSTRACT

An airplane which is universally adaptable to land on any type of flat surface, such as water, snow, ice, as well as land. The landing pods of the aircraft include a wheel with a V-shaped ski surface surrounding each wheel. Each landing pod is constructed in the shape of a hydrofoil for moving through water and creating lift. A boat is detachably securable to the underside of the fuselage of the aircraft. The boat functions as pontoons when the plane is landing and parked on water.

1 Claim, 21 Drawing Figures

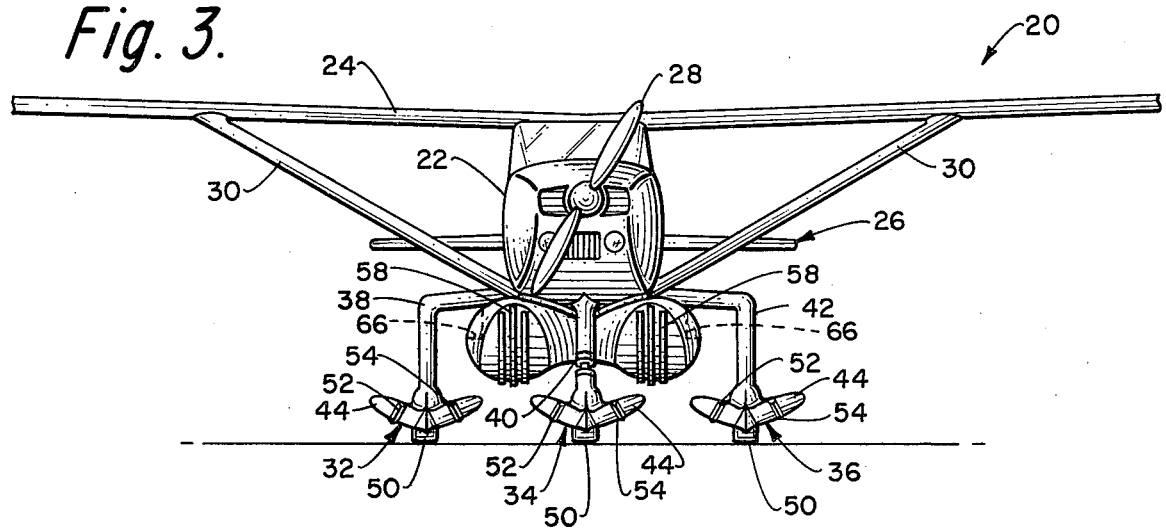
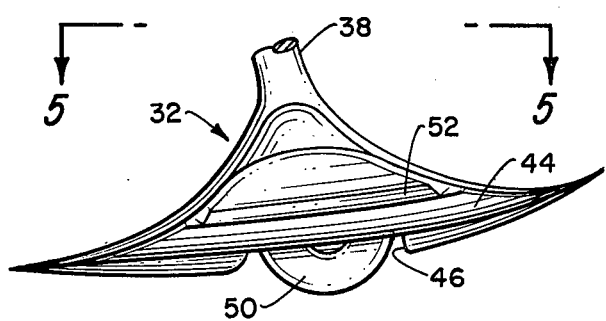
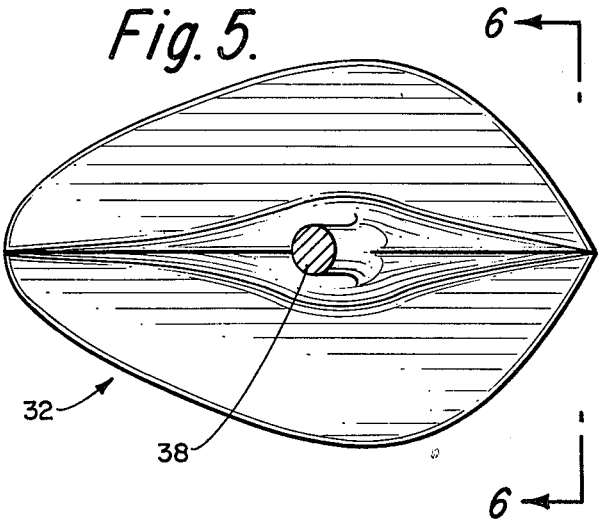
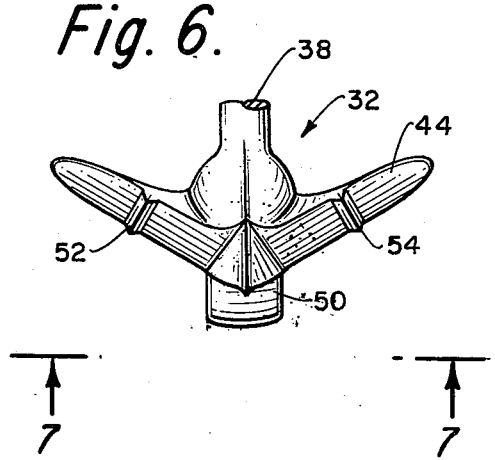
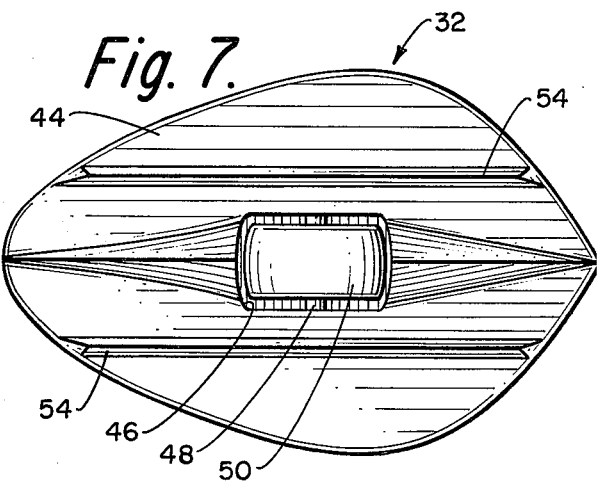

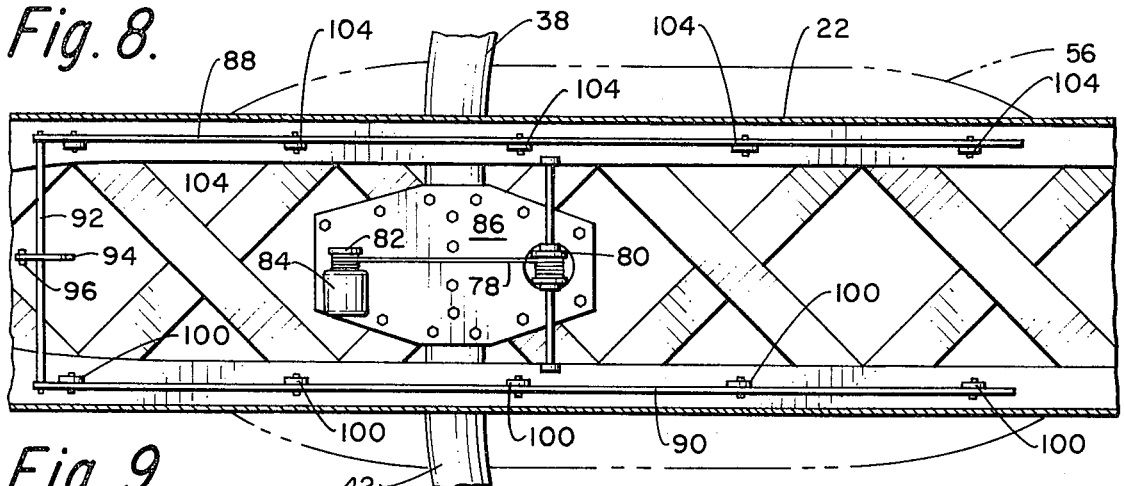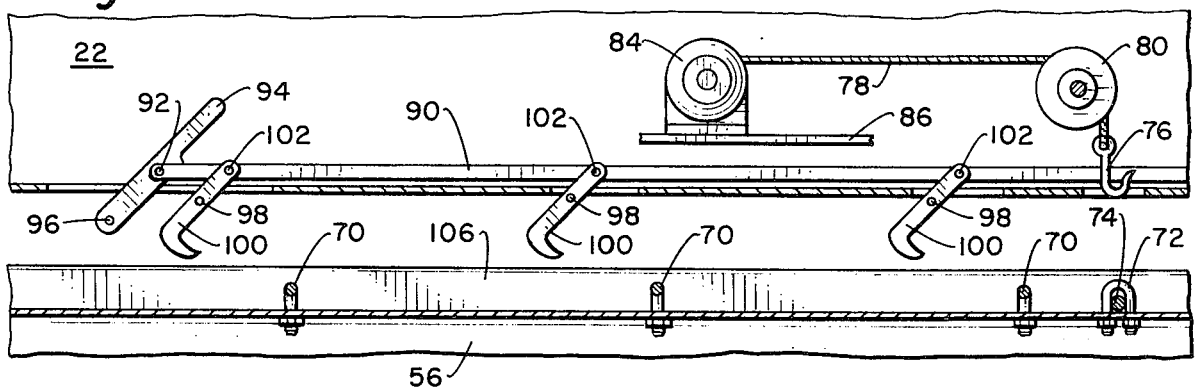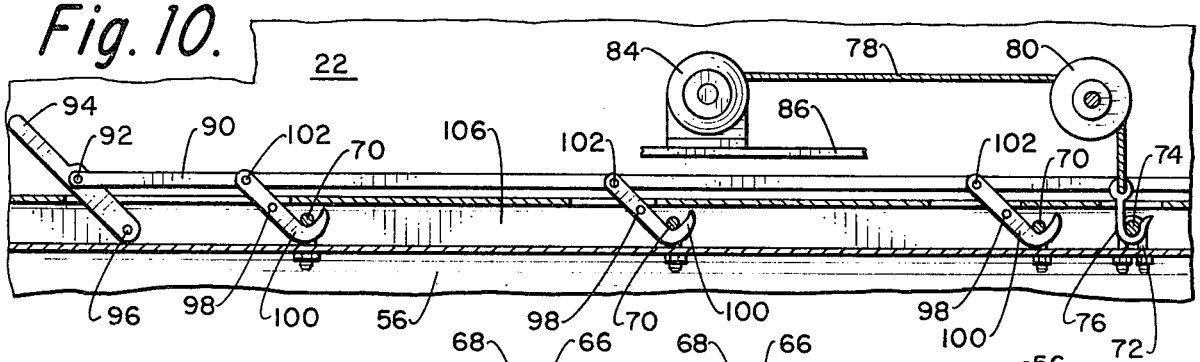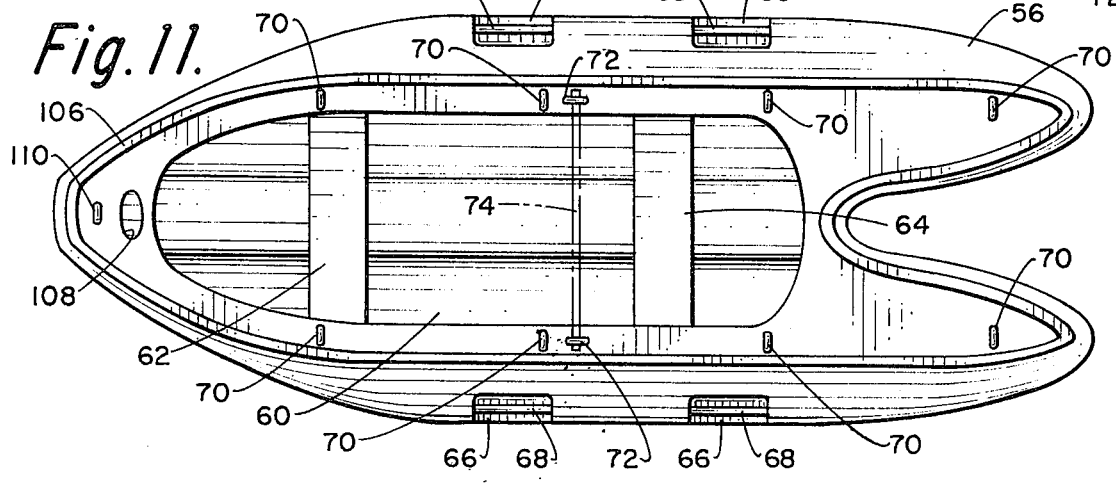

55-65 MPH 50-55 MPH 35-40 MPH 20-30 MPH

STOPPED

TAXI

25 MPH 40-45 MPH 60-65 MPH

LIFT-OFF ated that the description of pod 32 will also similarly apply to pods 34 and 36.

AIRPLANE

BACKGROUND OF THE INVENTION

The field of this invention relates to airplanes, and more particularly to an airplane which is adapted to land on any type of surface without modification or replacement of any portion of the landing pods.

At the present time, there are airplanes which are designed to land on water and there are airplanes that are designed to land on land and also there are airplanes designed to land on snow and ice. Most airplanes are designed primarily to land on land. When one desires to have the plane land on water, the landing wheels would be replaced with pontoons. If one desires for the airplane to land on snow or ice, the wheels would be replaced with skis. However, there is no known way for an airplane to take off from land and then land on water or ice and vice versa.

Also at the present time, airplanes, even the small airplane, is designed to be usable in conjunction with landing strips or other designated landing areas. As a result, the versatility of an airplane is lost. In other words, a person cannot use an airplane to gain total access to inaccessible areas. For example, a person could not, at the present time, take off from a landing field, fly an airplane and land on a remote lake, spend time camping, and then take off from the lake and then return to the landing field. Also, when the person is at the lake, there is no vehicle other than the plane itself for which the person can use to move around. It would be particularly desirable to have a rigid walled boat detachably securable to the exterior of the fuselage of the aircraft which would give the pilot and passengers of the aircraft some other means of transportation on a lake after landing on the lake and parking same on shore.

SUMMARY OF THE INVENTION

The airplane of this invention is designed to take off from one particular type of landing surface and be capable of landing on other types of landing surfaces. The airplane of this invention is primarily designed as a sporting aircraft which would permit persons to fly the plane from populated areas and then land the plane in inaccessible areas.

The airplanes of this invention has landing pods which are designed to function as a hydrofoil through water, as a ski if the craft is landed on snow or ice and also include wheels for landing on a hard, flat surface. The airplane of this invention also includes a hard shelled boat which is fastened to the underside of the fuselage of the aircraft. The boat can be readily removed and used separately from the aircraft. The separation of the boat only occurs after the airplane is parked on its wheels on shore. The boat functions as water pontoons for landing and parking on water. Previously, pontoon aircraft have only been of the high-wing type. However, this invention can be used on not only high-wing aircraft but also on low-wing aircraft.

BRIEF DESCRIPTION OF THE DRAWINGS

FIG. 3 is a front view of the aircraft of this invention taken along line 3—3 of FIG. 1;

FIG. 4 is a side view of one of the landing pods employed within the airplane of this invention;

FIG. 5 is a top view of the landing pod taken along line 5—5 of FIG. 4;

FIG. 6 is a front view of the landing pod taken along line 6—6 of FIG. 5;

FIG. 7 is a bottom view of the landing pod taken along line 7—7 of FIG. 6;

FIG. 8 is a cross-sectional view to the fuselage of the aircraft taken along line 8—8 of FIG. 1;

FIG. 9 is an enlarged cross-sectional side view of the latching arrangement to securely lock the boat to the fuselage, showing the latches in the unlatched position;

FIG. 10 is a view similar to FIG. 9 but showing the latches in the latched position;

FIG. 11 is a top view of the boat which is to be connected to the bottom side of the fuselage of the aircraft;

DETAILED DESCRIPTION OF THE SHOWN EMBODIMENT

Figure 1:
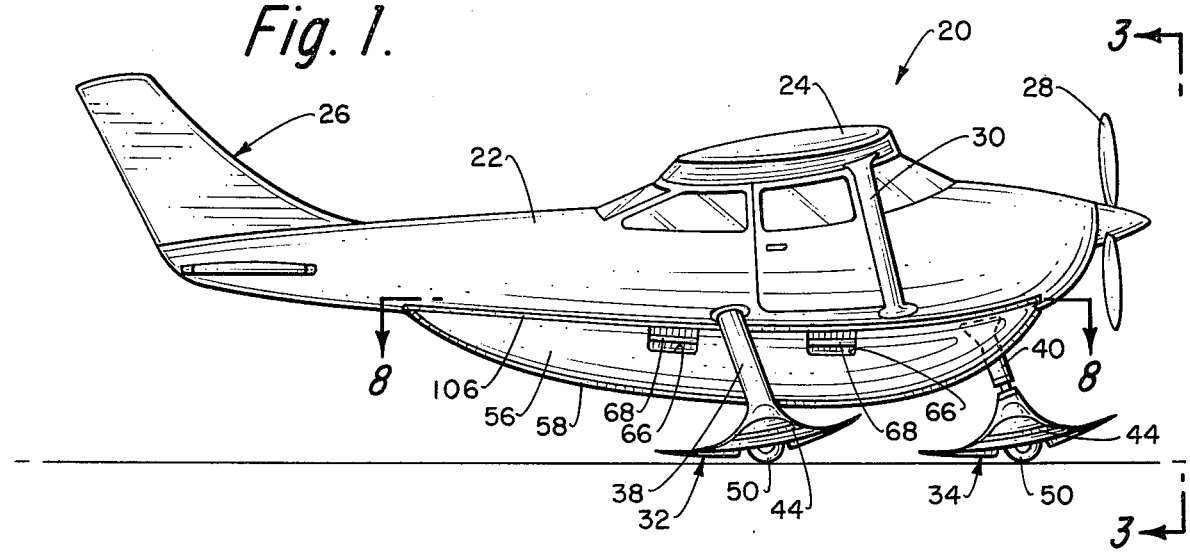
FIG. 1 is a side view of the airplane of this invention.
Figure 2:
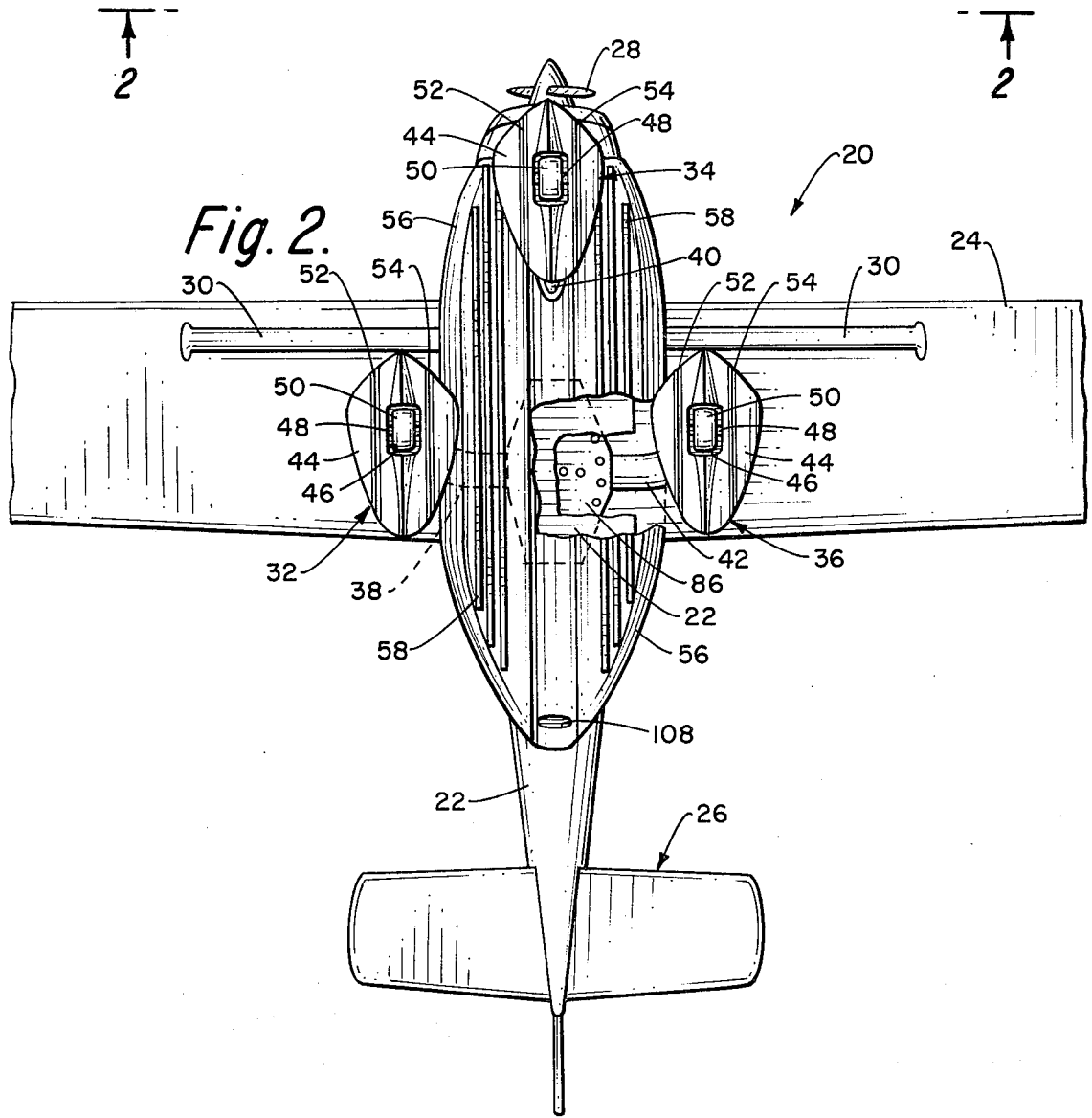
FIG. 2 is a bottom view of the aircraft of this invention taken along line 2—2 of FIG. 1.
Figure 12A:
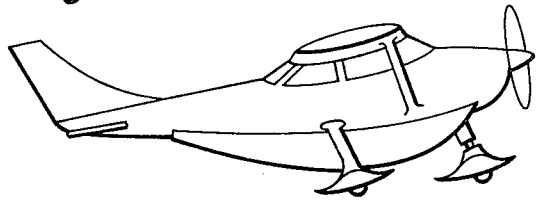
FIGS. 12a to 12e diagramatically depict the proper landing of the aircraft on water.
Figure 12B:
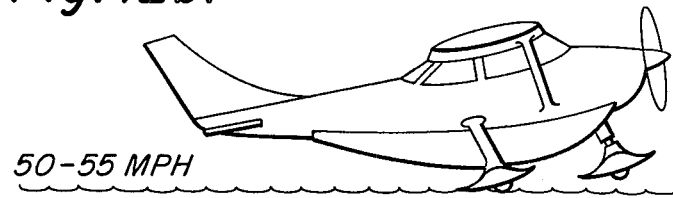
Figure 12C:
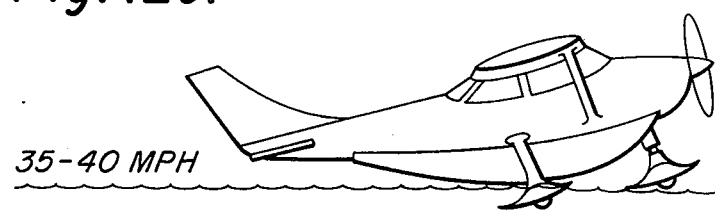
Figure 12D:
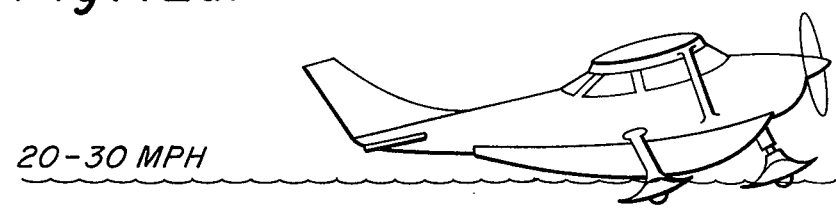
Figure 12E:
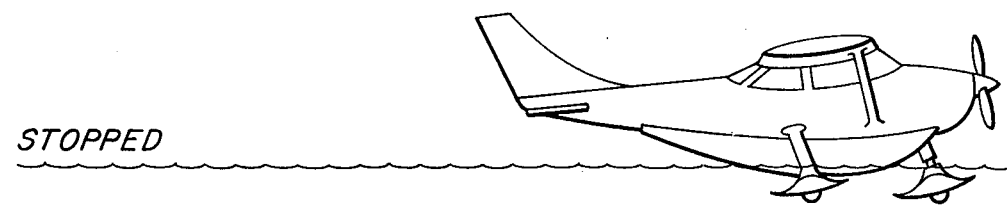
Figure 13A:
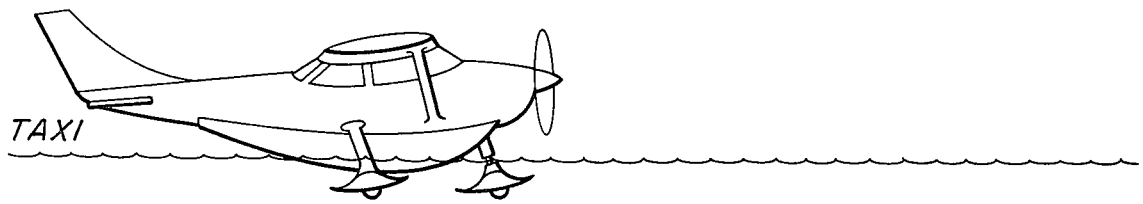
FIGS. 13a to 13e diagramatically depict the proper procedure for aircraft take-off from water.
Figure 13B:
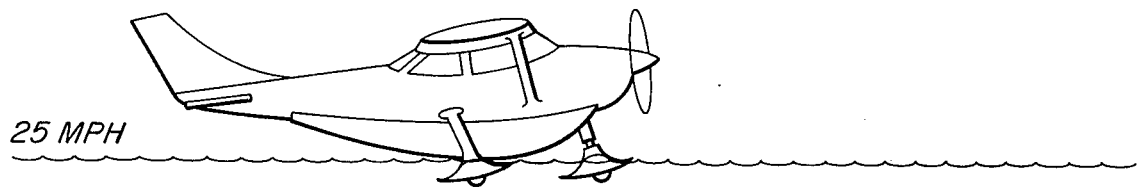
Figure 13C:
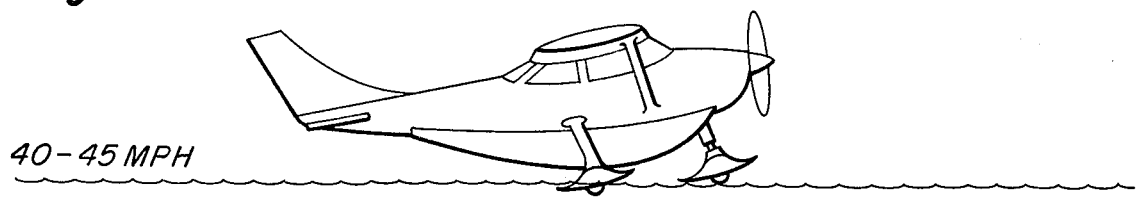
Figure 13D:
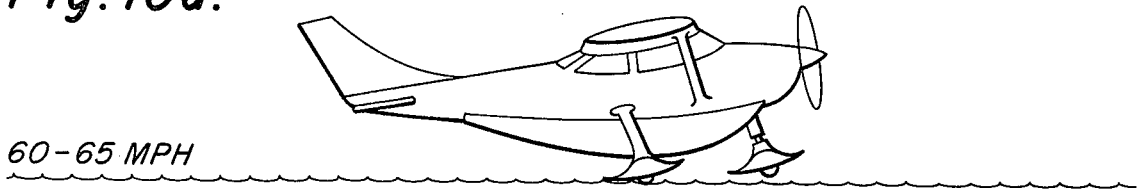
Figure 13E:
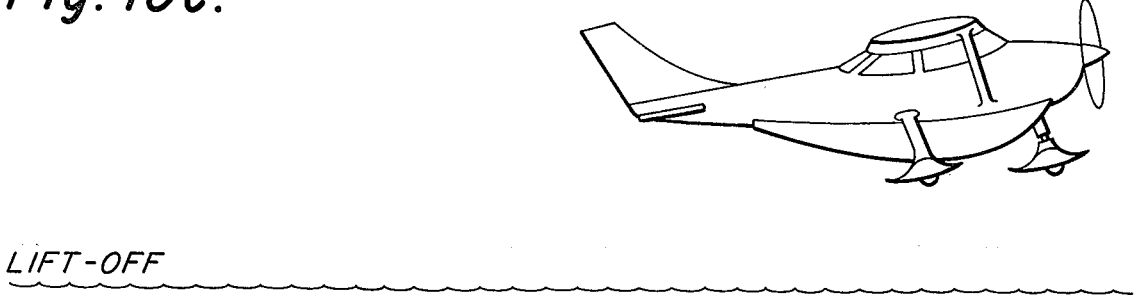

Referring particularly to the drawings, there is shown in FIG. 1 the airplane 20 of this invention. The airplane 20 is composed generally of a fuselage 22, a wing 24 and an empennage 26. The airplane 20 is driven by a motor which operates the propeller 28. The wing 24 is fixedly secured to the fuselage 22 by supporting struts 30. The landing pods 32, 34 and 36 are attached to the fuselage 22 by means of landing struts 38, 40 and 42, respectively. Each of the pods 32, 34 and 36 are basically identical in configuration and therefore it is to be understood that the description of pod 32 will also similarly apply to pods 34 and 36.

It is to be noted that each of the pods 32, 34 and 36 are inclined with respect to horizontal as shown in FIG. 1 of the drawings. This is for the purpose that when the aircraft lands that the force of landing is transmitted substantially longitudinally as possible along the axis of each of the struts 38, 40 and 42.

Each of the pods 32, 34 and 36 are substantially V-shaped in cross-section and are in the shape of a hydrofoil from the front portion of the pod to the rear portion of the pod. The purpose of the hydrofoil is that with the aircraft taxiing in water, that lift is provided on each of the pods tending to move the aircraft out of the water.

The lower surface of each of the pods 32, 34 and 36 is referred to as the ski surface 44. The surface 44 is to facilitate movement of each of the pods across snow and ice and that actually the surface 44 will function as though the aircraft had a plurality of skis when it is landed upon snow and ice.

Formed within the ski surface 44 and within each pod 32, 34 and 36 is a central opening 46. Within the opening 46 there is rotatably mounted by means of an axle 48 a wheel 50. The wheel 50 functions as a normal landing wheel when the aircraft is landed on the hard surface. However, when the aircraft is landed on show or ice, the effect of the wheel is negligible and the ski surface 44 is the primary landing member. When the aircraft of this invention is landed in water, at the initial time of landing the ski surface 44 is the primary landing element as the aircraft skims along the top surface of the water. When the aircraft slows sufficiently, the pods 32, 34 and 36 will submerge and at that time the hydrofoil shape of each of the pods will come into being and will be the primary landing element.

Located on the ski surface 44 of each pod are a pair of suction breaking ribs 52 and 54. These ribs function to break the suction that is created between the pod and the surface of the water during take-off. Without the ribs 52 and 54, there will be a force created tending to hold the aircraft on the surface of the water during take-off.

Attached to the underside of the fuselage 22 is a boat 56. The bottom surface of the boat 56 also includes a plurality of suction breaking ribs 58 and these ribs are to function in the same manner as previously described with respect to ribs 52 and 54. It is to be noted that there are six in number of such ribs 58 but that the number of ribs is considered to be a matter of choice. The same is true for the number of ribs located upon each pod.

The boat 56 is formed of a rigid material, such as metal or plastic and is to be sufficiently strong so as to be carried through the air by the airplane 20. The boat 56 includes an internal compartment 60 within which are placed the passenger supporting seats 62 and 64. The compartment 60 can be used as a storage compartment during flight of the airplane 20.

The boat functions as a pontoon (or pontoons) during landing and parking of the airplane on water. The boat may be removed and the aircraft flown. If the boat is removed, the aircraft is only to take off from and landed on hard surface landing conditions (snow, ice and ground).

Formed within the side walls of the boat 56, on the exterior surface of the boat 56, are hand-holding recesses 66. The recesses 56 are also to function as a step for getting into and out of the airplane 20. Located within each recess 66 is a hand-holding bar 68.

Located within the gunwale section of the boat 66 are a plurality of U-shaped retaining members 70. These members 70 are fixedly secured by bolts to the boat 56.

A similar pair of bar retaining members 72 are also secured to the boat 56 at substantially in alignment with the center of gravity of the boat 56. The members 72 are to permit insertion of a bar 74. Because the members 72 are located substantially in alignment with the center of gravity of the boat 56, the bar 74 is also in alignment with the center of gravity. The bar 74 is to be connectable with a hook 76 of a cable 78. The cable 78 is conducted over a pulley 80 as attached to an operating pulley 82 of a winch motor 84. The winch motor 84 is to be electrically driven (or hand operated) from a source of electrical energy (not shown). The winch motor 84 is fixedly mounted upon a mounting plate 86. The function of the winch motor 84, the cable 78 and the hook 76 is so that with the hook 76 cooperating with the bar 74 that the boat 56 can be raised or lowered with respect to the fuselage 22.

Within the fuselage of the aircraft is a first elongated rod 88 and a second elongated rod 90. Rods 88 and 90 are connected together through a rod 92. Located between the elongated members 88 and 90 and connected to the rod 92 is a lever 94. This lever 94 is adapted to be hand operated and extends within the fuselage 22. The lever 94 is pivotally mounted with respect to the fuselage 22 by means of a pivot pin 96.

Also pivotally mounted by means of pivot pins 98 to the fuselage 22 are a plurality of latches 100. The latches 100 are also pivotally mounted by means of pivot pins 102 to the elongated member 90. In a similar manner, a plurality of latches 104 are pivotally secured to the fuselage and also pivotally connected to the elongated member 88. A single latch 100 and a single latch 104 is to cooperate with a single member 70 on the boat 56. With the handle 94 in the position shown in FIG. 9 of the drawings, the latches 100 and 104 are disconnected from the member 70 and the boat 56 can be readily removed from the fuselage 22 of the airplane 20. This removing of the boat 56 from the fuselage 22 is normally accomplished by means of the winch 84.

When it is desired to resecure the boat 56 to the fuselage 22, the boat 56 is placed in position beneath the fuselage 22, the bar 74 is then placed in cooperation with the member 72. The hook 76 is then placed in connection with the bar 74 and the winch 84 is activated which causes raising of the boat 56 into contact with the lower surface of the fuselage 22. The operator then moves handle 94 which results in pivoting motion of each of the latches 100 and 104 so that each latch will cooperate with a member 70 thereby securing the boat 56 to the underside of the fuselage 22. It is envisioned that the upper edge 106 of the gunwale section of the boat 56 will include a strip of rubber material so as to accomplish a snug, vibration free interfit between the boat 56 and the fuselage 22.

It is to be noted that in the back end of the boat 56 there is provided an opening 108 which is to facilitate cooperation of the boat 56 with a motor, such as an outboard motor. Adjacent opening 108 is a member 110 which is to cooperate with a separate latch (not shown) which is located within the fuselage of the aircraft. This cooperation with the member 110 is accomplished in a manner similar to operation of latches 100 and 104.

For a pictorial depiction of the landing of the airplane 20 upon water, reference is to be had to FIGS. 12a, 12b, 12c, 12d and 12e. These figures show the approximate position of the aircraft at different velocities during landing of the airplane of this invention in water.

Reference is to be had to FIGS. 13a, 13b, 13c, 13d and 13e which show the reverse procedure or the take-off of the aircraft from water. Again, at different positions of the aircraft, the approximate velocity of the craft is also shown.

What is claimed is:
1. An airplane comprising:
   a fuselage;
   a wing attached to said fuselage;
   landing pods attached to said fuselage, each said pod including a landing wheel, each said pod including a ski surface in the area surrounding said landing wheel, each said pod being hydrofoil shaped, whereby said airplane is capable at all times of landing on land, water, snow and ice;
   a boat, said boat being securable by securing means to the underside of said fuselage, said securing means being operable to permit detachment of said boat from said fuselage, said boat functioning as a pontoon to buoyantly support said airplane upon water and also functioning as a speed decreasing surface during landing;
   said securing means comprises a plurality of movable latches movable between a locked position and unlocked position, each said latch being connected together to operate simultaneously in movement between said locked position and said unlocked position, said latches being operable from within the inside of said fuselage, each said latch connects with a fixed member located on said boat when in the latched position with there being a separate said fixed member for each said latch;

winch means connected to said fuselage, said winch means being connectable with said boat to effect raising and lowering of said boat with respect to said fuselage;

said ski surface being substantially V-shaped in cross-section;

a plurality of suction breaking ribs formed on said ski surface, each said rib being located substantially parallel to the longitudinal axis of said fuselage.

* * * * *